United States Patent [19]

Roberts

[11] 4,055,549
[45] Oct. 25, 1977

[54] THERMOPLASTICALLY PROCESSABLE POLYURETHANES BASED ON TOLYLENE DIISOCYANATE

[75] Inventor: Rene Roberts, Charleston, W. Va.

[73] Assignee: Union Carbide Corporation, New York, N.Y.

[21] Appl. No.: 683,638

[22] Filed: May 5, 1976

[51] Int. Cl.² .................. C08G 18/42; C08G 18/82; C08G 18/10
[52] U.S. Cl. .................. 260/77.5 AN; 260/2.5 BC; 260/2.5 BD; 260/77.5 AA
[58] Field of Search ............. 260/77.5 AN, 2.5 AN, 260/77.5 AA

[56] References Cited

U.S. PATENT DOCUMENTS

| | | | |
|---|---|---|---|
| 2,818,404 | 12/1957 | Hill | 260/2.5 AT |
| 2,990,379 | 6/1961 | Young et al. | 260/77.5 AN |
| 2,990,379 | 6/1961 | Young et al. | 260/2.5 AN |
| 3,192,185 | 6/1965 | Achterhof et al. | 260/77.5 AA |
| 3,605,848 | 9/1971 | Lombardi et al. | 260/2.5 AN |
| 3,741,918 | 6/1973 | Koleske et al. | 260/77.5 AN |
| 3,775,354 | 11/1973 | Hostettler et al. | 260/2.5 AN |

OTHER PUBLICATIONS

Japanese Publication, JA 49045991-Yamauchi Rubber (1974).

Primary Examiner—H.S. Cockeram
Attorney, Agent, or Firm—Francis M. Fazio

[57] ABSTRACT

Thermoplastically processable polyurethanes are produced by the reaction of tolylene diisocyanate, at least one polycaprolactone diol, a low molecular weight diol chain extender and water.

16 Claims, No Drawings

THERMOPLASTICALLY PROCESSABLE POLYURETHANES BASED ON TOLYLENE DIISOCYANATE

BACKGROUND OF THE INVENTION

The preparation of thermoplastically processable polyurethanes by the reaction of hydroxyl terminated polymers, organic diisocyanates and low molecular weight chain extenders has been practiced for some time. Particularly, it is disclosed in U.S. Pat. No. 3,523,101 that hydroxyl terminated polycaprolactones can be used to produce thermoplastic polyurethanes which form articles having excellent mechanical properties. It is known in the prior art that a variety of organic diisocyanates can be employed, such as, for example, bis(4-isocyanatophenyl) methane diisocyanate, hexamethylene diisocyanate, tolylene diisocyanate, isophorone diisocyanate, naphthalene diisocyanate, xylylene diisocyanate and the like. When bis(4-isocyanatophenyl)methane diisocyanate or hexamethylene diisocyanate is employed, as disclosed in U.S. Pat. No. 3,523,101, polyurethanes are obtained which may be thermoplastically processed to produce articles having good hardness and tensile strength. By comparison, thermoplastic polyurethanes produced by the aforementioned method using tolylene diisocyanate have usually exhibited poor mechanical properties when processed by conventional methods such as injection and compression molding. Generally, articles molded from tolylene diisocyanate based polyurethanes have not achieved an acceptable balance of tensile strength, stiffness and hardness to be used in a broad range of applications.

Due to the ready availability and low cost of tolylene diisocyanate, many efforts have been made to produce commercially acceptable thermoplastically processable polyurethane compounds based on tolylene diisocyanate. Resins produced by reacting tolylene diisocyanate, hydroxyl terminated polymers and low molecular weight chain extenders have been filled with as much as 30% by weight of reinforcing fillers such as carbon black to improve mechanical properties. While the room temperature tensile strength of articles molded from these materials was appreciably greater than that of articles molded from unfilled tolylene diisocyanate based polyurethanes, low and high temperature impact strength and heat distortion were such that often the materials were unsuitable for use in conventional molded or extruded products. Other attempts to produce thermoplastically processable tolylene diisocyanate based polyurethanes which produce formed articles having a good balance of mechanical properties have not been fully successful.

SUMMARY OF THE INVENTION

It has now been discovered that thermoplastically processable polyurethane compounds which form articles having good mechanical properties, such as tensile strength, hardness, stiffness and low temperature impact strength are provided by the reaction of tolylene diisocyanate, at least one polycaprolactone diol having a molecular weight of from about 1,000 to 4,000, a low molecular weight chain extender and water.

DETAILED DESCRIPTION OF THE INVENTION

The novel polyurethane compounds of the present invention are produced by reacting at least one polycaprolactone diol, tolylene diisocyanate, a low molecular weight chain extender and water. The polycaprolactone diols used have molecular weights from about 1,000 to 4,000, preferably from 2,000 to 3,000. Polycaprolactone diols are well known to those skilled in the art as being useful in the production of polyurethanes. Said polycaprolactone diols can be produced by reacting epsilon caprolactone or an alkyl-substituted epsilon caprolactone with a suitable difunctional initiator, such as, for example, ethylene glycol, di-, tri-, or tetraethylene glycol, propylene glycol, hexylene glycol, 1,5-pentanediol, 1,4-butanediol and the like. The reaction is illustrated by the following equation, which is particular to epsilon caprolactone and ethylene glycol.

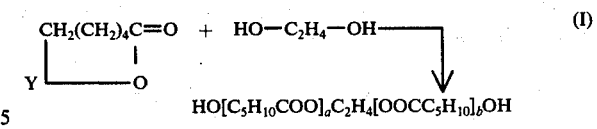

(I)

wherein $a$ and $b$ are any integers, including zero, such that $a$ plus $b$ equals Y, the monomer to initiator ratio, and wherein Y is an amount such that the polycaprolactone diol has an average molecular weight from about 1,000 to 4,000, preferably from 2,000 to 3,000. Also useful are the polycaprolactone copolymers obtained by the reaction of epsilon caprolactone or alkyl-substituted epsilon caprolactone, an alkylene oxide and a difunctional initiator, as described in U.S. Pat. No. 3,051,687.

Tolylene diisocyanate and methods of its preparation are so well known to those skilled in the art of polyurethane chemistry as to require no further description herein.

The low molecular weight diol chain extender used can be any of the organic diols commonly used as chain extenders in the polyurethane polymerization process and having molecular weights up to about 300. These are well known to those skilled in the art. Nevertheless, one can mention as illustrative thereof the substantially linear alkanediols or polyalkyleneoxy glycols, such as, for example diethylene glycol, triethylene glycol, tetraethylene glycol, propylene glycol, dipropylene glycol, tripropylene glycol, hexylene glycol, 1,3-propanediol, 1,4-butanediol, 1,5-pentanediol, and the like, diphenols such as xylylene glycol or phenylene glycol, and cycloaliphatic glycols such as cyclohexane dimethanol. Preferred chain extenders are the alkanediols or polyalkyleneoxy glycols having from 2 to 10 carbon atoms in the molecule.

It has been discovered that thermoplastically processable polyurethanes having a particularly good balance of mechanical properties, such as Shore hardness, tensile strength, stiffness and low temperature impact strength are obtained when the aforementioned reactants are reacted at a mole ratio of polycaprolactone diol: chain extender: tolylene diisocyanate: water of about 1:3–6:8–14:2–7, preferably about 1:4–5:10–12:2-.5–6 and the mole ratio of tolylene diisocyanate to water is from about 4:1 to about 2:1, preferably about 2:1. Those skilled in the art are fully aware that the equivalent ratio of hydroxyl (i.e.—OH) to isocyanato (i.e.

.—NCO) groups employed in a polyurethane producing reaction normally does not vary from unity by more than about 10%. Since the reaction and curing temperatures, specified hereinafter, may exceed the boiling point of water, resulting in evaporation, it is sometimes desirable to have an excess of water initially present in the reaction mass to ensure that the mole ratio of tolylene diisocyanate to water consumed in the reaction is from about 4:1 to about 2:1 and that the ratio of isocyanato groups to hydroxyl groups remains within the range of 1±0.1 throughout the reaction. The amount of excess water which is desirable varies with reaction conditions, such as temperature, pressure and type of reaction vessel used. Generally, the mole ratio of water to tolylene diisocyanate initially present in the reaction mass will not be greater than about 1:1.

It is believed that the improved properties of the tolylene diisocyanate based polyurethane thermoplastics of this invention are due to the in situ formation of N,N'-di(isocyanatotolylene)urea as an intermediate, by the reaction of water and tolylene diisocyanate according to the following equation:

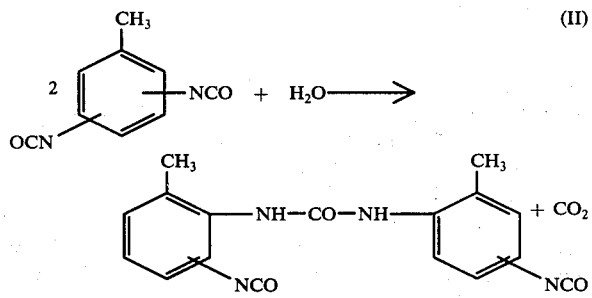

(II)

The N,N'-di(isocyanatotolylene)urea in turn reacts with the polycaprolactone diol and low molecular weight chain extender to form polyurethane molecules containing urea linkages, that is —NH—CO—NH—, which stiffen and harden the molecule.

The reaction which produces the thermoplastically processable polyurethanes of this invention is spontaneous and self-sustaining at room temperature and is exothermal. It is preferred to carry out the reaction with all the reactants in the liquid state. Thus, the polycaprolactone diol, which is solid at room temperature, is usually heated to at least about 50° C. to liquefy it before mixing the reactants. The heat of reaction is sufficient to maintain the polycaprolactone diol in a liquid state throughout the reaction unless excessive cooling is applied externally to the reaction vessel. The reaction time is not critical, however, it is usually rather short, that is, it is usually not more than about 10 minutes. It has been observed in some instances that the mechanical properties of the thermoplastically processable polyurethanes have been slightly improved by postcuring at a temperature of from 100° C. to 200° C. The reactants can be reacted by mixing them together substantially simultaneously. Alternatively, the tolylene diisocyanate and water can be prereacted to form N,N'-di(isocyanatolylene)urea, according to equation II above, and the N,N'-di(isocyanatotolylene)urea thereafter reacted with the polycaprolactone diol and low molecular weight chain extender. Since the reaction of the tolylene diisocyanate and water produces carbon dioxide, it is usually preferred to carry out the reaction in a reduced pressure atmosphere or to deaerate the reaction mass before it solidifies to prevent the inclusion of bubbles in the solid reaction product, unless one desires a foamed thermoplastic product.

The reaction can be carried out in the presence of a catalyst. Suitable catalysts include the known organotin catalysts such as the stannous salts of carboxylic acids (e.g. stannous octoate, stannous oleate, stannous laurate); the dialkyltin di-carboxylates such as dibutyltin dilaurate, dibutyltin diacetate, dilauryltin diacetate and dibutyltin di(2-ethylhexanoate); trialkylamines such as trimethylamine, and tributylamine tin mercaptides; dialkyltin oxides; and other suitable catalysts known to those skilled in the art. Catalysts, when used, are employed in the usual catalytically effective amounts known to those skilled in the art, either alone or in combinations.

It is to be understood that conventional additives such as colorants, fillers, flame retardants, etc., which are generally employed in thermoplastic material formulations, may be present in these polyurethanes in the usual known amounts. The polyurethane reaction products of this invention have reduced viscosities of from about 0.057 to about 0.220, measured at a concentration of 0.2 grams of resin in 100 ml. of dimethylformamide at 30° C. on an Ubbelhode viscometer. They can be processed by any means conventionally used in the fabrication of formed articles from thermoplastic materials, including, but not limited to, extrusion, injection molding, compression molding, and calendering, provided the compounds are not subjected to temperatures exceeding their decomposition temperature. While the decomposition temperature of the polyurethane compounds of this invention varies somewhat, depending upon the ratio of reactants employed, reaction conditions and choice of reactants, it will generally not be higher than about 225° C.

The reaction can be carried out in any of the numerous well known batch type reaction vessels or continuous processing equipment such as extruders, as hereafter illustrated in the examples which follow. When the reaction is carried out in an extruder, it is preferred to prereact the tolylene diisocyanate and water outside the extruder to prevent the generation of carbon dioxide and concomitant extreme pressure buildup in the extruder barrel.

By varying the mole ratio of reactants and the molecular weight of the polycaprolactone diol used, one can thereby control the mechanical properties of the formed polyurethane. For example, reaction of a polycaprolactone diol having an average molecular weight of 2,000, diethylene glycol, tolylene diisocyanate and water in a 1:4:10:5 mole ratio produced a polyurethane compound which, when molded, had a 100% modulus of 2,246 p.s.i., tensile strength of 3,256 p.s.i., Shore hardness of 60D and dart impact temperature of −30° F. By comparison, the reaction of a polycaprolactone diol having average molecular weight of 3,000, butanediol, tolylene diisocyanate and water in a mole ratio of 1:5:12:8 produced a polyurethane compound which, when molded, had a 100% modulus of 1,579 p.s.i., tensile strength of 4125 p.s.i., Shore hardness of 44D and dart impact temperature of −50° F. Generally, by increasing the molecular weight of the polycaprolactone diol used, one can obtain a polyurethane compound which produces formed articles having increased tensile strength, lower dart impact temperature and reduced stiffness.

The examples which follow are meant to further illustrate the invention described above and are not to be construed as limiting the invention. The following standard ASTM test methods were employed to determine the indicated mechanical properties of molded polyurethane products:

| PROPERTY | TEST METHOD |
| --- | --- |
| 100% Modulus | ASTM D 412 |
| Tensile strength, p.s.i. | ASTM D 412 |
| Elongation, % | ASTM D 412 |
| Shore hardness | ASTM D 2240 |
| Die "C" tear, p.l.i. | ASTM D 624 |
| Flex modulus | ASTM D 790 |

Dart impact is reported as the temperature at which the sample broke when impacted with a 90 lb. weight at 5 miles per hour.

The following abbreviations are used in the examples:
PCD = polycaprolactone diol
DEG = diethylene glycol
BDO = butanediol
TDI = tolylene diisocyanate It will be noted that in a number of examples an excess of water was employed in the reaction mass to compensate for evaporation of water caused by the heat of reaction and the fact that the reactor used was open to the atmosphere.

EXAMPLE 1

A series of thermoplastically processable polyurethane compounds was prepared as the reaction product of a polycaprolactone diol having an average molecular weight of about 2,000, diethylene glycol, tolylene diisocyanate and water. The PCD:DEG:TDI mole ratio was 1:3:8 in each case, while the mole proportion of water varied. As a control, two thermoplastically processable polyurethanes, C1 and C2, were prepared using the same reactants at a PCD:DEG:TDI ratio of 1:1:4 and two different thermoplastically processable polyurethanes, C3 and C4, were prepared at a PCD:DEG:TDI ratio of 1:2:6. The amounts of reactants used and mechanical properties of the thermoplastically processable polyurethane products are indicated in the table below.

|  | I | II | III | IV | C1 | C2 | C3 | C4 |
| --- | --- | --- | --- | --- | --- | --- | --- | --- |
| PCD, moles | 0.1 | 0.2 | 0.1 | 0.1 | 0.1 | 0.1 | 0.1 | 0.1 |
| DEG, moles | 0.3 | 0.6 | 0.3 | 0.3 | 0.1 | 0.1 | 0.2 | 0.2 |
| TDI, moles | 0.8 | 1.6 | 0.8 | 0.8 | 0.4 | 0.4 | 0.6 | 0.6 |
| Water, moles | 0.4 | 0.8 | 0.5 | 0.6 | 0.2 | 0.4 | 0.3 | 0.6 |
| 100% modulus, p.s.i. | 1280 | 1667 | 1587 | 1394 | 310 | 938 | 840 | 997 |
| 300% modulus, p.s.i. | 2371 | — | — | 2553 | 477 | — | 1793 | — |
| Tensile strength, p.s.i. | 2875 | 2795 | 3028 | 3421 | 2762 | 901 | 3671 | 1022 |
| Elongation, % | 367 | 220 | 273 | 400 | 640 | 227 | 417 | 207 |
| Shore hardness | 47D | 55D | 55D | 50D | 67A | 41D | 40D | 45D |
| Die "C" tear, p.l.i. | 583 | 663 | 683 | 617 | 253 | 423 | 411 | 475 |
| Reduced viscosity | 0.1 | 0.11 | 0.114 | 0.133 | 0.102 | 0.390 | 0.090 | 0.424 |
| Dart impact, °F. | −20 | −20 | −20 | −20 | −20 | −20 | −35 | −20 |

In Examples 1 through 5 the following procedure was used to produce the thermoplastically processable polyurethane compounds from the indicated reactants. The polycaprolactone diol was heated to about 60° C. and mixed with the low molecular weight chain extender (butanediol or diethylene glycol) in a 1-gallon reactor. The water was then added to the mixture, followed by addition of the tolylene diisocyanate with vigorous stirring. The foamed reaction mass was placed in an oven at 140° C. for about 18 hours. The resultant polyurethane polymer was cooled, removed from the reactor and band sawed into ½ in. cubes. The cubes were mixed with dry ice to reduce the temperature below the glass transition temperature and ground to granules about 150-in. in diameter. The granules were compression molded to produce plaques about 6-in. in diameter and about 25 mils thick for mechanical testing. Where standard test sample configurations other than circular plaques were required, for example tensile test bars, these were die cut from the molded plaques.

While controls C1 and C3 had tensile strengths comparable to samples I through IV and all the controls had good dart impact temperatures, thermoplastically processable polyurethanes I through IV showed a better balance of all mechanical properties than the controls.

EXAMPLE 2

A series of thermoplastically processable polyurethane compounds were produced using the same reactants as were used in Example 1 with a PCD:DEG:TDI mole ratio of 1:4:10, with the proportion of water varying. The amounts of reactants used and the mechanical and physical properties of the products are indicated in the table below. It can be seen that by reducing the relative amount of the polycaprolactone diol reactant one obtains a polyurethane of increased hardness. Generally, the thermoplastically processable polyurethanes of this example displayed an overall balance of mechanical properties superior to the 1:3:8 mole ratio products of Example 1 as well as the control products of Example 1.

|  | I | II | III | IV | V | VI |
| --- | --- | --- | --- | --- | --- | --- |
| PCD, moles | 0.1 | 0.2 | 0.1 | 0.1 | 0.1 | 0.1 |
| DEG, moles | 0.4 | 0.8 | 0.4 | 0.4 | 0.4 | 0.4 |
| TDI, moles | 1.0 | 2.0 | 1.0 | 1.0 | 1.0 | 1.0 |
| Water, moles | 0.5 | 1.0 | 0.7 | 0.7 | 0.7 | 0.8 |
| 100% Modulus, p.s.i. | 2,246 | 2,624 | 2,591 | 2,485 | — | 2,852 |
| Tensile strength, p.s.i. | 3,256 | 3,443 | 3,790 | 2,991 | 2,555 | 2,706 |
| Elongation, % | 250 | 187 | 230 | 148 | 53 | 127 |
| Shore hardness | 60D | 67D | 65D | 63D | 65D | 65D |
| Die "C" tear, p.l.i. | 756 | 735 | 844 | 807 | 680 | 809 |
| Reduced viscosity | 0.057 | 0.085 | 0.102 | 0.105 | 0.149 | 0.273 |
| Dart impact, °F. | −30 | −20 | −20 | −35 | — | — |

-continued

|  | I | II | III | IV | V | VI |
|---|---|---|---|---|---|---|
| Flex modulus, | | | | | | |
| at −20° F. | | 168,686 | | | 131,859 | |
| 75° F. | | 44,892 | | | 36,612 | |
| 158° F. | | 11,397 | | | 11,752 | |

EXAMPLE 3

To determine the effect of employing a higher molecular weight polycaprolactone diol, two thermoplastically processable polyurethanes were produced by the reaction of a polycaprolactone diol having an average molecular weight of about 3,000, butanediol, tolylene diisocyanate and water. The mole ratio of PCD:BDO:TDI: water was 1:4:10:9 in the run indicated as I in the table below and 1:4:10:10 in the run indicated as II. As a control, two thermoplastically processable polyurethanes, C5 and C6, were prepared using the same 3,000 molecular weight polycaprolactone diol at a PCD:BDO:TDI-water mole ratio of 1:1:4:4 and 1:2:6:6, respectively. Mechanical properties are indicated in the table below.

|  | I | II | C5 | C6 |
|---|---|---|---|---|
| 100% modulus, p.s.i. | 1,610 | 1,299 | 1,263 | 1,308 |
| 300% Modulus, p.s.i. | 3,987 | 3,694 | — | 1,423 |
| Tensile strength, p.s.i. | 5,588 | 4,593 | 1,304 | 1,809 |
| Elongation % | 357 | 337 | 320 | 457 |
| Shore hardness | 56D | 45D | 42D | 48D |
| Die "C" tear, p.l.i. | 722 | 629 | 660 | 681 |
| Reduced viscosity | 0.22 | −30 | −20 | −20 |
| Dart impact, ° F. | −45 | −30 | −20 | −20 |

The results of runs I and II produced thermoplastically processable polyurethanes having a better overall balance of mechanical properties than the controls. Particularly, they have better tensile strength and dart impact temperature than the controls.

EXAMPLE 4

A series of eight thermoplastically processable polyurethanes was produced using the same 3,000 molecular weight polycaprolactone diol as was used in Example 3, with a mole ratio of PCD:low molecular weight diol chain extender:TDI of 1:5:12, using varying proportions of water. The amounts of reactants employed and mechanical properties of the products obtained are indicated in the table below. Thermoplastically processable polyurethanes I, II and III exhibited a better balance of mechanical properties than controls C5 and C6 of Example 3, which employed the same reactants at mole ratios outside the scope of this invention.

|  | I | II | III | IV | V | VI | VII | VIII |
|---|---|---|---|---|---|---|---|---|
| PCD, moles | 0.1 | 0.1 | 0.1 | 0.1 | 0.1 | 0.1 | 0.1 | 0.1 |
| DEG, moles | — | — | — | 0.5 | 0.5 | 0.5 | 0.5 | 0.5 |
| BDO, moles | 0.5 | 0.5 | 0.5 | | | | | |
| TDI, moles | 1.2 | 1.2 | 1.2 | 1.2 | 1.2 | 1.2 | 1.2 | 1.2 |
| Water, moles | 0.9 | 1.0 | 1.1 | 0.7 | 0.8 | 0.9 | 1.0 | 1.1 |
| 100% modulus, p.s.i. | 1,128 | 1,609 | 1,600 | 2,178 | 1,579 | 1,547 | 2,001 | 1,774 |
| 300% modulus, p.s.i. | 3,288 | 3,823 | | 3,925 | 4,000 | 4,001 | 4,322 | 396 |
| Tensile strength, p.s.i. | 4,474 | 3,887 | 3,373 | 4,172 | 4,125 | 4,557 | 4,606 | 4,155 |
| Elongation, % | 353 | 310 | 272 | 320 | 287 | 337 | 317 | 317 |
| Shore hardness | 48D | 50D | 50D | 62D | 44D | 46D | 47D | 53D |
| Die "C" tear, p.l.i. | 587 | 664 | 588 | 804 | 640 | 709 | 747 | 722 |
| Reduced viscosity | 0.191 | 0.191 | 0.215 | 0.181 | 0.181 | 0.181 | 0.213 | 0.198 |
| Dart impact, ° F. | −50 | −40 | −45 | −50 | −50 | −50 | −50 | −50 |
| Flex modulus, | | | | | | | | |
| at −20° F. | | | | 112,411 | 65,978 | 62,735 | | 98,024 |
| at 75° F. | | | | 34,588 | 17,520 | 19,169 | | 32,411 |
| at 158° F. | | | | 4,798 | 4,400 | 5,378 | | 5,403 |

EXAMPLE 5

A series of thermoplastically processable polyurethanes was produced by reacting in each case 0.05 mole of a polycaprolactone diol having an average molecular weight of about 2,000, 0.05 mole of a polycaprolactone diol having an average molecular weight of about 3,000, 0.5 mole of diethylene glycol and 1.2 moles of tolylene diisocyanate with the amount of water indicated in the table below. The mechanical properties of the thermoplastically processible polyurethanes produced are indicated in the table. The results of this example indicate that thermoplastically processable polyurethanes of this invention having good mechanical properties can be produced using a mixture of polycaprolactone diols having different molecular weights.

|  | I | II | III | IV | V | VI |
|---|---|---|---|---|---|---|
| Water, moles | 0.6 | 0.7 | 0.8 | 0.9 | 1.0 | 1.1 |
| 100% modulus, p.s.i. | 2,357 | 2,171 | 2,355 | 2,242 | 2,225 | 2,303 |
| Tensile strength, p.s.i. | 3,308 | 2,473 | 4,305 | 3,083 | 3,780 | 3,910 |
| Elongation, % | 200 | 150 | 270 | 185 | 250 | 253 |
| Shore hardness | 58D | 64D | 56D | 54D | 54D | 57D |
| Die "C" tear, p.l.i. | 795 | 696 | 757 | 822 | 720 | 788 |
| Reduced viscosity | 0.133 | 0.14 | 0.169 | 0.193 | 0.191 | 0.207 |
| Dart impact, ° F. | −20 | — | −45 | −40 | −30 | −20 |
| Flex modulus, at −20° F. | 159,155 | — | 107,721 | 88,378 | 90,238 | 77,640 |
| at 75° F. | 49,193 | — | 27,772 | 21,255 | 23,148 | 25,552 |
| at 158° F. | 10,845 | — | 8,903 | 6,659 | 10,379 | 10,617 |

EXAMPLE 6

This example illustrates the preparation of the thermoplastically processable polyurethanes of this invention using a vented extruder. A 500-ml. round bottomed flask, fitted with a condenser, stirrer and dropping funnel, was charged with 1,974 grams of tolylene diisocyanate. The flask was placed in a boiling water bath and 9 grams of water was added, dropwise, to the flask over a 30 minute period. The mixture in the flask was reacted for two hours and the resulting N,N'-di(isocyanatotolylene)urea was allowed to solidify. The N,N'-di(isocyanatotolylene)urea was then ground to a powder consistency. A mixture of 667 grams of a melted polycaprolactone diol having an average molecular weight of about 2,000 and 141 grams of diethylene glycol was placed in a double layered polyethylene bag and cooled in dry ice until it was sufficiently brittle to break into granules. The PCD/DEG mixture was mixed with 610 grams of the powdered N,N'-di(isocyanatotolylene)urea produced above and charged to the feed hopper of a vented single-screw extruder having a length to diameter ratio of 36:1. A continuous flow of argon was circulated through the feed hopper. The extruder had six temperature control zones which were kept at the following temperatures throughout the extrusion: (from feed hopper to die), 100° C., 160° C., 170° C., 180° C., and 180° C. The vent was connected under atmospheric pressure to a dry ice trap. The thermoplastic polyurethane product was discharged through a strand die. A tensile test specimen was compression molded from a portion of the polyurethane extrudate and found to have a tensile strength of 3,200 p.s.i., a tensile modulus of 23,800 and elongation of 167%. The remaining extrudate was extruded again. A tensile test specimen, compression molded from the reextruded material, had a tensile strength of 4,200 p.s.i., a tensile modulus of 43,500 and elongation of 146%. The increase in tensile strength after the second extrusion indicated that polymerization was incomplete after the initial extrusion. However, the results of this example illustrate that polymerization to form the thermoplastically processable polyurethanes of this invention can be carried out in extrusion equipment to produce material which forms articles having good strength.

EXAMPLE 7

Using a procedure similar to that of Examples 1 through 5, two thermoplastically processable polyurethane compounds were prepared using 0.05 mole of a polycaprolactone diol having an average molecular weight of about 2,000, 0.05 mole of a polycaprolactone diol having an average molecular weight of about 3,000, 0.5 mole of diethylene glycol and 1.2 moles of tolylene diisocyanate. One sample, Sample A, was prepared using 0.8 moles of water and the other, Sample B, was prepared using 0.9 moles of water. Both samples were reduced to granules in a manner similar to the polyurethanes of Examples 1 through 5. A portion of Sample B was dried by placing it in an oven at 70° C. under a partial vacuum overnight. Tensile test bars were injection molded from Sample A using a barrel temperature, measured immediately prior to the nozzle, of 350° F., a nozzle temperature of 335° F. and a mold filling pressure of 700 p.s.i. The bars, which had a somewhat rough, uneven surface, were subjected to tensile testing on equipment with a maximum capacity of 4,000 p.s.i. applied stress. All of these bars had tensile strength greater than 4,000 p.s.i. and elongation of between 400% and 500% at 4,000 p.s.i. Tensile test bars were injection molded from the dried portion of Sample B using a barrel temperature, measured immediately prior to the nozzle, of 390° F., a nozzle temperature of 350° F. and a mold filling pressure of 800 p.s.i. The bars produced from Sample B had a smooth surface and had tensile strength greater than 4,000 p.s.i. and elongations of between 400% and 500%. The results of this example indicate that the thermoplastically processable polyurethane compounds of this invention can be processed by injecting molding to produce molded articles having good mechanical properties.

What is claimed is:

1. A method for producing a thermoplastically processable polyurethane, which comprises simultaneously reacting
   a. a polycaprolactone diol having a molecular weight of from 1,000 to 4,000;
   b. a low molecular weight diol chain extender;
   c. tolylene diisocyanate; and
   d. water,
   the mole ratio of a:b:c:d employed in the reaction being 1:3-6:8-14:2-7 and the ratio of c:d employed in the reaction being from 2:1 to 4:1.

2. A method as claimed in claim 1, wherein the polycaprolactone diol has a molecular weight of from 2,000 to 3,000.

3. A method as claimed in claim 1, wherein the mole ratio of a:b:c:d employed in the reaction is 1:4–5:-10–12:2.5–6.

4. A method as claimed in claim 1, wherein the low molecular weight diol chain extender is chosen from the group consisting of the alkanediols having from 2 to 10 carbon atoms and the polyalkyleneoxy glycols having from 2 to 10 carbon atoms.

5. A method as claimed in claim 1, wherein the mole ratio of c:d employed in the reaction is 2:1.

6. A method as claimed in claim 3, wherein the mole ratio of c:d employed in the reaction is 2:1.

7. The thermoplastically processable polyurethane produced by the method of claim 1.

8. The thermoplastically processable polyurethane produced by the method of claim 2.

9. The thermoplastically processable polyurethane produced by the method of claim 3.

10. The thermoplastically processable polyurethane produced by the method of claim 4.

11. The thermoplastically processable polyurethane produced by the method of claim 5.

12. The thermoplastically processable polyurethane produced by the method of claim 6.

13. A method of producing a thermoplastically processable polyurethane, which comprises the steps of:
    a. prereacting (i) tolylene diisocyanate and (ii) water to form N,N'-di(isocyanatotolylene)urea; then
    b. reacting the N,N'-di(isocyanatotolylene)urea thus formed with (iii) a polycaprolactone diol having a molecular weight of from 1,000 to 4,000 and (iv) a low molecular weight diol chain extender, the overall mole ratio of i:ii:iii:iv employed in steps (a) and (b) being 8–14:2–7:1:3–6 and the mole ratio of i:ii employed in step (a) being from 2:1 to 4:1.

14. A method as claimed in claim 13, wherein step (b) is carried out in an extruder.

15. The thermoplastically processable polyurethane produced by the method of claim 13.

16. The thermoplastically processable polyurethane produced by the method of claim 13.

* * * * *

UNITED STATES PATENT OFFICE
CERTIFICATE OF CORRECTION

Patent No. 4,055,549           Dated Oct. 25, 1977

Inventor(s) Rene Roberts

It is certified that error appears in the above-identified patent and that said Letters Patent are hereby corrected as shown below:

Column 5, line 51, "150-in." should read ---1/8-in.---

Column 7, lines 4-6, the values of flex modulus listed under "II" should appear under "III" and the values of flex modulus listed under "V" should appear under "VI"

Signed and Sealed this

Fourth Day of July 1978

[SEAL]

Attest:

RUTH C. MASON  
*Attesting Officer*

DONALD W. BANNER  
*Commissioner of Patents and Trademarks*